United States Patent [19]

Cornell et al.

[11] 3,821,152

[45] June 28, 1974

[54] HEAT RESISTANT VULCANIZABLE BLEND OF BUTADIENE/STYRENE RUBBERS AND ETHYLENE-PROPYLENE-DIENE TERPOLYMERS

[75] Inventors: William H. Cornell, Stow; Roy W. Siedenstrang, Akron, both of Ohio

[73] Assignee: Phillips Petroleum Company, Bartlesville, Okla.

[22] Filed: Jan. 19, 1973

[21] Appl. No.: 324,974

[52] U.S. Cl..... 260/33.6 AQ, 260/41.5 R, 260/889, 260/894
[51] Int. Cl..... C08c 11/18, C08c 11/22, C08d 9/08
[58] Field of Search............. 260/889, 894, 33.6 AQ

[56] References Cited
UNITED STATES PATENTS

| | | | |
|---|---|---|---|
| 3,304,281 | 2/1967 | Tucker | 260/33.6 |
| 3,352,944 | 11/1967 | Wheat | 260/876 |
| 3,387,063 | 6/1968 | Bailey | 260/888 |
| 3,443,619 | 5/1969 | Kindle | 260/894 |
| 3,451,962 | 6/1969 | Auler et al. | 260/41.5 R |
| 3,658,732 | 4/1972 | Ballini et al. | 260/889 |

FOREIGN PATENTS OR APPLICATIONS

| | | | |
|---|---|---|---|
| 994,726 | 6/1965 | Great Britain | 260/33.6 AQ |
| 962,519 | 7/1964 | Great Britain | 260/33.6 AQ |

OTHER PUBLICATIONS

The Vanderbilt Rubber Handbook, (R. T. Vanderbilt Co.), (N.Y.), (1968), (11th ed.), pages 358 & 359.

*Primary Examiner*—Morris Liebman
*Assistant Examiner*—H. H. Fletcher

[57] ABSTRACT

A sulfur vulcanizable blend having improved properties is obtained by blending from 40 to 60 parts by weight of a solution polymerized copolymer of butadiene and styrene, from 10 to 55 parts by weight of an emulsion polymerized copolymer of butadiene and styrene, from 25 to 45 parts by weight of a termpolymer of ethylene, propylene and a diene comonomer, from 40 to 70 parts by weight of an extender oil per 100 parts by weight of total polymer, and from 120 to 200 parts by weight of carbon black per 100 parts by weight of total polymer.

11 Claims, No Drawings

HEAT RESISTANT VULCANIZABLE BLEND OF BUTADIENE/STYRENE RUBBERS AND ETHYLENE-PROPYLENE-DIENE TERPOLYMERS

This invention relates to vulcanizable blends of butadiene/styrene elastomers and ethylene-propylene-diene terpolymer, and to the products produced therefrom. In a specific aspect the invention relates to flexible mandrels.

Flexible mandrels having a long length for use in the manufacture of certain types of hose offer obvious handling and storage advantages over mandrels made of rigid materials. However, to provide operating performance equivalent to that provided by rigid mandrels, the flexible mandrels must be made of a material which retains its flexibility after prolonged use at curing temperatures, which has high hardness and high resistance to flat-spotting in the uncured state, which has non-staining and good release characteristics, and which has good extrusion properties and low compression set. Of course, it is also desirable that the material have a low compound cost. However, no single material has all of the desired properties.

We have discovered that we can obtain the desired balance of properties by blending three different types of rubbers even though they are individually deficient in one or more of the properties. Specifically, we blend from 40 to 60 parts by weight of a solution polymerized copolymer of butadiene and styrene, from 10 to 55 parts by weight of an emulsion polymerized copolymer of butadiene and styrene, from 25 to 45 parts by weight of a terpolymer of ethylene, propylene and a diene comonomer, from 40 to 70 parts by weight of an extender oil per 100 parts by weight of total polymer, and from 120 to 200 parts by weight of carbon black per 100 parts by weight of total polymer.

Accordingly, it is an object of the invention to provide a new and improved sulfur vulcanizable, heat resistant blend of rubbers. Another object of the invention is to provide a flexible mandrel having improved operating characteristics. Other objects, aspects and advantages of the invention will be apparent from a study of the specification and the appended claims to the invention.

The solution polymerized copolymers of butadiene and styrene which can be employed in the blend of the present invention are prepared by the polymerization of butadiene and styrene in a hydrocarbon diluent in the presence of an alkali metal initiator. The presently preferred solution polymerized copolymers are random copolymers having a butadiene-to-styrene molar ratio in the range of about 70:30 to about 80:20, and more preferably in the range of about 73:27 to about 77:23 with no detectable polystyrene. While any known alkali metal initiator can be employed, the alkyllithiums are preferred, with n-butyllithium being the presently preferred species. Examples of other suitable initiators include methyllithium, sec-butyllithium, tert-octyllithium, p-tolyllithium, 1,4-dilithiobutane, and the like, and mixtures thereof. A randomizing agent is advantageously employed in the solution polymerization process. Examples of suitable randomizing agents include potassium tert-amyl alcoholate, potassium tert-butoxide, tetrahydrofuran, 1,4 dioxane, dioctyl ether, and mixtures thereof, with tetrahydrofuran being presently preferred. Examples of suitable hydrocarbon diluents which can be used in the solution polymerization process include n-pentane, cyclohexane, benzene, toluene, isooctane, n-dodecane, and the like, and admixtures thereof. Any of the conventional shortstop agents can be employed to terminate the solution polymerization, and examples thereof include tin tetrachloride, silicon tetrachloride, alcohol, fatty acids and the like, and mixtures thereof.

The emulsion polymerized copolymers of butadiene and styrene which can be employed in the blend of the present invention are prepared by the polymerization of butadiene and styrene in an aqueous medium in the presence of a fatty and/or rosin acid soap at temperatures in the range of about 40 to about 125° F, preferably in the range of about 40° to about 75° F. The emulsion polymerized copolymers presently preferred for use in the blend have a butadiene-to-styrene molar ratio in the range of about 70:30 to about 80:20, more preferably in the range of about 74:26 to about 78:22, and a Compound Mooney in the range of about 40 to about 60, more preferably in the range of about 46 to about 56.

The ethylene-propylene-diene terpolymer is a copolymer of ethylene, propylene and a diene comonomer. The molar ratio of ehtylene to propylene will generally be in the range of about 75:25 to about 55:45, and preferably in the range of about 70:30 to about 60:40. The diene comonomer will generally be present in an amount in the range of 1.2 to about 10, preferably in the range of about 1.5 to about 5, and more preferably in the range of about 2 to about 2.5 mol percent, based on the total mols of propylene and ethylene. The diene comonomer can be any monomer which has two olefinic double bonds and is copolymerizable with ethylene and propylene. The hydrocarbyl diolefins having four to 12 carbon atoms are presently preferred. Examples of suitable diene comonomers include dicyclopentadiene, hexadiene, norbornene, methylene norbornene, ethylidene norbornene, cyclo-octadiene, and the like, and mixtures thereof. The terpolymer can be produced by any technique known to the art.

The carbon black will generally be employed in an amount in the range of about 120 to about 200, preferably in the range of about 130 to about 170, parts by weight per 100 parts by weight of the total polymer in the blend. The carbon black will generally have a particle size in the range of $0.01\mu$ to about 10 microns, preferably in the range of about $.10\mu$ to about $5\mu$.

Other fillers known for use with rubber can be employed in addition to the carbon black, if desired. Such fillers will also generally have a particle size in the range of about 0.01 micron to about 10 microns.

Similarly, any known extender oil can be employed in the blend, including the hydrocarbon fractions, particularly those high in aromatic content. The extender oil will generally be employed in an amount in the range of about 40 to about 70, preferably in the range of about 50 to about 60, parts by weight per 100 parts by weight of total polymer in the blend.

A portion or all of the extender oil and/or filler can be admixed with one or two of the rubber components before blending with the remaining components or all of the components can be blended simultaneously. The blending can be effected in any suitable manner known to the art, including banbury, blending extruder, mixing rolls, and the like.

Sulfur and/or sulfur-containing compounds can be added to the blend to effect vulcanization upon heating. Other materials, such as plasticizers, anti-oxidants, and the like can also be added to the blends as desired.

In a presently preferred embodiment, the blend has a compression set (ASTM-D 395-61) of less than 25, more preferably less than about 22, and an uncured hardness of at least about 65, more preferably at least about 70.

The following examples are presented in further illustration of the invention, but should not be construed in undue limitation thereof.

EXAMPLES

Sample recipes shown below were compounded on a Banbury mixer and subjected to prolonged aging and ozone resistance tests as described. The data are tabulated below, wherein all parts are by weight, and the sample designations refer to the recipe employed:

The compounded Mooney ML 1 ½ and ML 4 at 212° F were determined on standard samples (ASTM D-1646-61), with the following results:

| Sample | ML 1 ½ | ML 4 |
|--------|--------|------|
| A | 121 | 115 |
| B | 154 | 154 |
| C | 133 | 126 |
| D | 125 | 119 |
| E | 124 | 119 |

Garvey Die Extrusion characterization was made at 250° F at 18 RPM, with the following results:

| Recipe | A | B | C | D | E |
|--------|---|---|---|---|---|
| Recipe Component | | | | | |
| Emulsion SBR Masterbatch[1] | 32.6 | 217.5 | — | — | 32.6 |
| Solution SBR random polymer[2] | 50 | — | 100 | — | 50 |
| EPDM[3] | 35 | — | — | 100 | 35 |
| Carbon black N550 (ASTM D 1765-71) | 138 | 70 | 150 | 150 | 138 |
| Hydrated Silica | 10 | 10 | 10 | 10 | 10 |
| Naphthenic Extender oil | 50 | 18.1 | 55.6 | 55.6 | 50 |
| Aromatic Hydrocarbon Resin (Harwick Standard Chemical Co. Piccodiene 14215) | 10 | 10 | 10 | 10 | 10 |
| Zinc Oxide | 3 | 3 | 3 | 3 | 3 |
| Stearic Acid | 1.5 | 1.5 | 1.5 | 1.5 | 1.5 |
| Poly 1,2-dihydro-2,2,4 trimethylquinoline | 2 | 2 | 2 | 2 | 3 |
| Sym-di B naphthyl p-phenylene diamine | 0.5 | 0.5 | 0.5 | 0.5 | — |
| Di-2-benzothiazyldi sulfide | 2.5 | 2.5 | 2.5 | 2.5 | — |
| Tetramethylthiuram disulfide | 1 | 1 | 1 | 1 | 0.5 |
| Tetraethylthiuram disulfide | 1 | 1 | 1 | 1 | — |
| Diphenylamine/diisobutylene reaction product | — | — | — | — | 2 |
| 4,4' dithiodimorpholine | — | — | — | — | 2 |
| tert, butyl-2 benzo-thiazole-sulfenamide 2 | — | — | — | — | 2 |
| Sulfur | 0.3 | 0.3 | 0.3 | 0.3 | — |
| Total parts | 337.4 | 337.4 | 337.4 | 337.4 | |
| Total parts polymer | 100 | 100 | 100 | 100 | 100 |
| Total parts carbon black | 150 | 150 | 150 | 150 | 150 |
| Total parts extender oil | 55.6 | 55.6 | 55.6 | 55.6 | 55.6 |

(1) A masterbatch of 100 parts of an emulsion polymerized butadiene/styrene copolymer have a butadiene/styrene molar ratio of 75:25, polymerized at 41°F, mixed acid catalyst, Mooney ML-4=49, compounded with 80 parts by weight carbon black (N550, ASTM) and 37.5 parts by weight of a naphthenic extender oil.

(2) A solution polymerized random copolymer of butadiene/styrene having a butadiene/styrene molar ratio of 75:25, polymerized with an n-butyl lithium initiator in a hydrocarbon diluent, randomized with tetrahydrofuran and short-stopped with fatty acid. Compounded Mooney ML-4 at 212°= 80.

(3) A terpolymer of ethylene, propylene and ethylidene norbornene having an unsaturation of 2.0 mol percent and an ethylene/propylene ratio of 65/35.

The ingredients were mixed at 140° F by adding the ingredients gradually over a 3-minute period, allowing an additional 3 minutes for blending the stock during which time the temperature rose to 300° F at which temperature it was dumped. The uncured rubber of recipes A, B, C, D and E had a Shore A hardness (ASTM-D676-59T) of 72, 64, 73, 68 and 67 respectively. Samples of each recipe were cured at 315° F for 15 or 20 minutes.

| Sample | cc/meter | sec/meter | Rating (4 is best) Surface/Edge/Cover |
|--------|----------|-----------|----------------------------------------|
| A | 22.4 | 10.8 | |
| B | 23.4 | 12.8 | All 4/4/4 |
| C | 22.2 | 12.5 | |
| D | 21.9 | 12.3 | |
| E | 22.6 | 9.0 | |

The tensile (ASTM 530), elongation (ASTM 530) and compression set (ASTM D 395-61) were determined, for unaged samples to be as follows:

| Sample | Tensile psi 15 min cure- | 20 min cure | Elongation 15 min cure- | 20 min cure | Compression Set 15 min cure | 20 min cure |
|---|---|---|---|---|---|---|
| A | 1140 | 1150 | 110 | 110 | 17.5 | 14.9 |
| B | 1180 | 1230 | 220 | 220 | 17.8 | 14.6 |
| C | 1560 | 1520 | 220 | 210 | 17.5 | 13.4 |
| D | 1000 | 1070 | 200 | 210 | 36.9* | 32.4* |
| E | 1360 | 1400 | 110 | 120 |  | 21.9 |

*Sample D, 100% EPDM, has an unacceptably high compression set value.
Ozone resistance with 100 ppm ozone at 100° F (ASTM 1149-60) was determined.
The rating is based on a scale of 0 to 10, with 0 being the best represented by no cracks.

| Sample/ Time, hrs. | 3 | 6 | 24 | 72 | 96 | Comments |
|---|---|---|---|---|---|---|
| A | 0 | 0 | 0 | 0 | 0 | Outstanding |
| B | 4 | 10 | 10 | 10 | 10 | Failed |
| C | 4 | 10 | 10 | 10 | 10 | Failed |
| D | 0 | 0 | 0 | 0 | 0 | 0 outstanding |
| E | 0 | 0 | 0 | 0 | 0 | 0 do. |

Thus EPDM (Sample D) contributes its outstanding ozone resistance to blends A and E of the invention without deterioration of the compression set values of the emulsion polymerized rubber (sample B) and the solution polymerized rubber (sample C).

Twelve inch samples were extruded through a three-fourths inch die at 250° F. These uncured samples were tested in forced draft oven at 300° F. Each sample was allowed to cool for 1 hour and then flexed over a 3 ½ inch mandrel once for determination of cracking. Heat aging of the sample was then resumed until time for the next bend test, 24 hours later. All samples were O.K. at the end of 4 days. Samples A, B, C, E cracked after 5 days, while sample D was still free of cracks after 7 days.

Samples were tested for aging stability in a forced draft oven at 212° F or 300° F for 70 hours. The results are as follows:

Oven aged 70 hours at 212° F

| Sample | Tensile psi | Elongation | ASTM D-676-59T Shore A Hardness 15' | 20' | % Tensile Retained 15' | 20' | % Elongation Retained 15' | 20' (cure) |
|---|---|---|---|---|---|---|---|---|
| A |  |  | 86 | 86 | 106.1 | 105.2 | 90.9 | 90.9 |
| B |  |  | 84 | 85 | 156.8 | 146.6 | 72.7 | 77.3 |
| C |  |  | 86 | 85 | 100.6 | 102.0 | 72.7 | 76.2 |
| D |  |  | 84 | 84 | 88.7 | 85.3 | 80.0 | 85.7 |
| E |  |  | 89 | 88 | 99 | 103 | 82 | 92 |
| Oven aged 70 hours at 300° F | | | | | | | | |
| A | 1880–1910 | 10 | 20 | 100 | 100 | 164.9 | 166.9 | 9.1 | 18.2 |
| B | 1830–1900 | 10 | 10 | 100 | 100 | 155.1 | 161 | 4.5 | 4.5 |
| C | 1600–1700 | 20 | 20 | 100 | 100 | 102.6 | 112 | 9.1 | 9.5 |
| D | 1620–1740 | 90 | 80 | 98 | 98 | 108.0 | 110.8 | 45.0 | 38.1 |
| E | 2020–1880 | 10 | 10 | 97 | 95 | 149 | 134 | 9 | 8 |

The data show that the three-way blends (blends A and E) provide fast extrusion rates, low compression set, high elongation retention, and adequate ozone resistance, and retain flexibility for 96 hours at 300° F.

Compared to the three-way blends:

The emulsion polymerized copolymer (sample B) fails ozone resistance and has lower uncured hardness, which may lead to flat spotting.

The solution polymerized copolymer alone (sample C) fails ozone resistance.

The ethylene-propylene-diene copolymer (sample D) has low uncured hardness and high compression set.

We claim:

1. A heat resistant, vulcanizable blend which comprises, from about 40 to 60 parts by weight of a solution polymerized random copolymer of butadiene and styrene having a butadiene-to-styrene molar ratio in the range of about 70:30 to about 80:20, from about 10 to about 55 parts by weight of an emulsion polymerized copolymer of butadiene and styrene having a butadiene-to-styrene molar ratio in the range of about 70:30 to about 80:20, from about 25 to about 45 parts by weight of a terpolymer of ethylene, propylene and a diene comonomer with an ethylene-to-propylene molar ratio in the range of about 75:25 to about 55:45 and said diene comonomer being present in an amount in the range of about 1.2 to about 10 mol percent based on the total mols of ethylene and propylene, from about 40 to about 70 parts by weight of an extender oil per 100 parts by weight of total polymer in the blend, and from about 120 to about 200 parts by weight of carbon black per 100 parts by weight of total polymer in the blend, said blend having a compression set (ASTM-D 395-61) of less than 25 and an uncured hardness of at least 65.

2. A blend in accordance with claim 1 wherein said solution polymerized copolymer of butadiene and styrene has a butadiene-to-styrene molar ratio in the range of about 73:27 to about 77:23 with no detectable polystyrene.

3. A blend in accordance with claim 1 wherein said emulsion polymerized copolymer of butadiene and styrene has a butadiene-to-styrene molar ratio in the range of about 74:26 to about 78:22.

4. A blend in accordance with claim 1 wherein said blend has a compression set (ASTM-D 395-61) of less than 22 and an uncured hardness of at least about 70.

5. A blend in accordance with claim 1 wherein said terpolymer has an ethylene-to-propylene molar ratio in the range of about 70:30 to about 60:40, with said diene comonomer being present in an amount in the range of about 1.5 to about 5 mol percent based on the total mols of ethylene and propylene.

6. A blend in accordance with claim 5 wherein said solution polymerized copolymer of butadiene and styrene has a butadiene-to-styrene molar ratio in the range of about 73:27 to about 77:23, and wherein said emulsion polymerized copolymer of butadiene and styrene has a butadiene-to-styrene molar ratio in the range of about 74:26 to about 78:22.

7. A blend in accordance with claim 6 wherein said solution polymerized copolymer was produced by solution polymerizing butadiene and styrene in a hydrocarbon diluent in the presence of an alkali metal initiator and of tetrahydrofuran as a randomizing agent and was shortstopped with fatty acid, and wherein said emulsion polymerized copolymer has a Compound Mooney in the range of about 46 to about 56.

8. A blend in accordance with claim 7 wherein said diene comonomer is ethylidene norbornene.

9. A blend in accordance with claim 1 further comprising a sulfur-containing vulcanizing agent.

10. A molded vulcanized article prepared from the blend of claim 9.

11. A flexible mandrel prepared from the blend of claim 9, and which has a compression set (ASTM-D 395-61) of less than 25 and an uncured hardness of at least about 70.

* * * * *